United States Patent Office 3,552,887
Patented Jan. 5, 1971

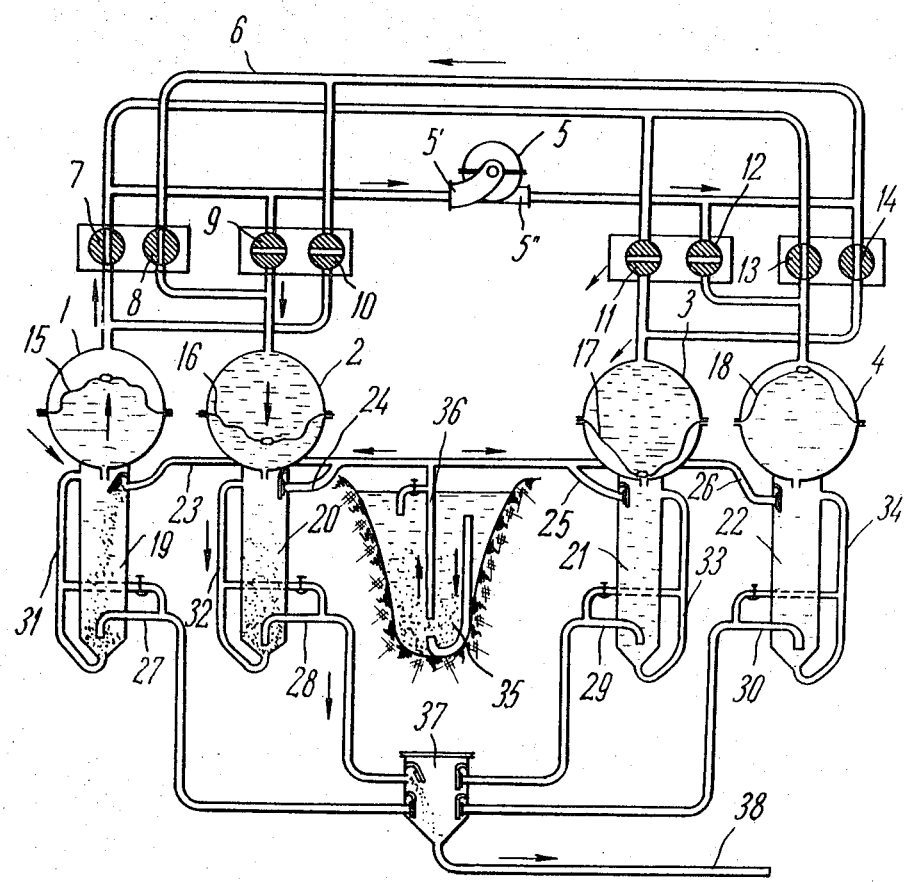

3,552,887
PUMPING PLANT FOR PUMPING FLUIDS
CARRYING SOLID PARTICLES
Sergei Antonovich Korzhaev, Oktyabrsky prospekt 164, kv. 33; Vladimir Vasilievich Dobrovolsky, Poselok VUGI 12, kv. 44; Oleg Mikhailovich Kodolov, Ulitsa Initsiativnaya 30, kv. 21; and Gennady Pavlovich Dmitriev, Poselok VUGI 1, kv. 22, all of Ljubertsy Moskovskoi oblasti, U.S.S.R.
Filed Oct. 23, 1968, Ser. No. 770,004
Int. Cl. F04b 17/00
U.S. Cl. 417—395       5 Claims

ABSTRACT OF THE DISCLOSURE

A pumping plant for handling fluids carrying solid particles comprises pressure-suction chambers each separated by a diaphragm into an upper cavity filled with working fluid and connected to a pump, and a lower cavity filled with fluid to be treated. The lower cavity is connected to a vertical elongated accumulating settler in which the solid particles of the fluid to be treated are settled. The upper portion of the settler is supplied with the fluid to be treated and clarified fluid at the top of the settler is circulated to the bottom of the settler by an external pipe to form a pulp with the accumulated solids which is externally discharged.

The present invention relates to plants for pumping fluids carrying solid particles, especially large-size ones, such as crushed stone, by means of a working fluid, and more particularly it relates to those plants which are provided with pressure-suction chambers with movable barriers installed therein, said barriers separating the working fluid from the one being pumped. These plants are intended for handling loose materials, such as sand, gravel, crushed stone etc.

Known in the prior art are plants of this tpye, wherein the pressure-suction chambers are essentially spheres, having a diaphragm, separating the working fluid from the one being pumped.

A disadvantage of these plants is that they can handle only more or less table suspensions and are unfit for handling fluids carrying sand, crushed stone etc., as these materials quickly precipitate, resulting in clogging the branches of the pressure-suction chambers.

It is also known that for handling fluids carrying sand, crushed stone, coal etc., pipe-type pumping plants are used, wherein there are no pressure-suction chambers, and the working fluid is not separated from the one being handled.

Due to this the working fluid is fouled in these plants, resulting in quick damage of the plant pump.

An object of the invention is the elimination of the disadvantages of the known plants and combination of their advantages in one plant.

Another object of the invention is to ensure uninterrupted operation of the pressure-suction chambers of a pumping plant handling fluids carrying a coarse-dispersion phase, which may be sand, crushed stone etc.

This object is achieved in that in a pumping plant for handling fluids carrying solid particles, by means of a working fluid and provided with pressure-suction chambers with movable barriers, particularly diaphragms, installed therein and separating the working fluid from the one being handled, these chambers are narrowed and elongated downwards to ensure accumulation of the solid constituents of the fluid being handled, the pipe delivering the fluid being handled, being connected to the top of the elongated part of each pressure-suction chamber, while a drain pipe is connected to the lower part thereof above the bottom. Additionally the elongated part of each chamber is provided with a by-pass pipe, connecting the top and bottom of the elongated part and ensuring the delivery of the clarified fluid into the accumulated residue.

To ensure a pause between the loading and unloading of the fluid being handled into the pressure-suction chambers and full separation thereof, it is expedient to join the pressure-suction chamber in pairs via the pump so that the pairs of the chambers operate alternately, and in the course of each pair operation one chamber is filled with the working fluid while said fluid is sucked from the other chamber.

Given below is a detailed description of an exemplary embodiment of the present invention by way of example with reference to the accompanying drawing, the sole figure is a diagrammatic view of the pumping plant in accordance with the present invention.

The pumping plant comprises four pressure-suction chambers 1, 2, 3 and 4, joined in pairs (that is, the chamber 1 with the chamber 2 and the chamber 3 with the chamber 4) via a high-pressure pump 5 (having a suction side 5' and delivery side 5") by means of pipes 6 also joined in pairs by valves 7–14. Each of the pressure suction chambers is provided with a diaphragm (15, 16, 17, 18) which prevents mixing of the working fluid with the one being handled.

Each chamber 1, 2, 3 and 4 has a depending elongated lower part (19, 20, 21 and 22) which serves to accumulate the solid constituent of the fluid being handled.

Pipes 23, 24, 25 and 26 deliver the fluid being handled to the respective elongated parts 19, 20, 21 and 22, while pipes 27, 28, 29 and 30 serve for the removal of the fluid being handled.

By-pass pipes 31, 32, 33 and 34 connect the tops of the elongated parts 19, 20, 21 and 22 to the bottoms thereof and serve to deliver the cleared water from the top part into the accumulated residue. This provides favorable conditions for the residue removal.

Water containing sand is pumped from a sump 35. Prior to the mixture handling, each pair of the plant chambers is set in a working state.

For this purpose the chambers 1 and 3 with the help of special pumps (not shown in the drawings) are filled with the working fluid so that the diaphragms 15 and 17 are in lowermost position, while the chambers 2 and 4 are filled with the fluid being handled or pure water so that the diaphragms 16 and 18 are in the uppermost position. Then the two pairs of valves 7, 8 and 13, 14 are opened and the pump 5 is activated on. This causes the movement of the mixture from the sump 35 through a pipe 36 and then through the pipe 23 into the chamber 1 as well as the displacement of the mixture or pure water from the lower part of the chamber 2 through the pipe 28.

Despite the fact that the valves 13 and 14 are opened the chambers 3 and 4 will not operate as the diaphragms 17 and 18 are pressed against the walls of these chambers by the pressure of the respective fluids, and will not allow the mixture to enter the chamber 3 and the working fluid to be displaced from the chamber 4. It is necessary to keep the valves 13 and 14 opened in order that during the operation of the pair of chambers 1 and 2 the diaphragms of the chambers 3 and 4 be kept pressed against the walls of these chambers, that is, remain in the initial position before the beginning of the operation of this pair.

After arriving in the elongated part 19 of the chamber 1, the mixture being handled will be separated, forming sand residue.

Before the pair of chambers 1 and 2 stop operating, the valves 13 and 14 are automatically closed and the valves 11 and 12 are opened. In this case both pairs of chambers will operate in parallel for a certain short period of time until the diaphragm 15 comes upwards and the diaphragm 16 downwards until they bear against the respective walls of the chambers 1 and 2. After this only the pair of chambers 3 and 4 will operate, and the chambers 1 and 2 will not operate until the chambers 3 and 4 pass the part of the cycle, similar to the one described in connection with the chambers 1 and 2, the valves 7 and 8 being kept opened.

During the pause the sand residue in the chamber 1 will be fully accumulated.

At the moment when the diaphragm 17 of the chamber 1 goes upwards until it bears against the upper wall and the diaphragm 18 of the chamber 4 goes downwards until it bears against the lower wall, the valves 9 and 10 will be opened and the valves 7 and 8 will be closed after which the working fluid delivery into the chamber 1 and its suction from the chamber 2 will begin. This will cause the mixture to suction, as has been explained hereinabove, into the elongated part 20 of the chamber 2 and displacement of the residue from the elongated part 19 of the chamber 1. As a result of the fact that the cleared water will be delivered through the by-pass pipe 31 from the top into the residue in the bottom, favorable conditions will be provided for pulp formation and sand removal through the pipe 27.

Then the operating cycles of the chambers and the whole plant will be repeated as described hereinabove.

From the pipes 27, 28, 29 and 30 the fluid being pumped will be delivered via valve box 37 into the pressure pipe 38 and then to the place where it is required.

The plant is described herein with reference to handling a water and sand mixture, nevertheless it can be used for handling mixtures containing crushed stone, crushed coal etc., and also suspensions.

Ball floats can be used instead of diaphragms, but in this case it is necessary to make the pressure-suction chambers of cylindrical shape.

What we claim is:

1. A pumping plant for handling fluids carrying solid particles by means of a working fluid, said plant comprising: a plurality of pressure-suction chambers; movable means located within said chambers and separating each of the same into upper and lower cavities, the upper cavity being filled with working fluid and the lower cavity being filled with handled fluid containing the solid particles; means coupled to said lower cavity of each chamber for accumulating the solid particles of the handled fluid, the latter accumulating means having a lower portion for accumulation of residue and an upper portion for clarified fluid; a pump for delivering working fluid into the upper cavity of each said pressure-suction chambers and for sucking said working fluid from said chambers; a system of pipes connecting said pressure-suction chambers and said pump; valve means for alternately connecting said pump to said chambers for delivery and suction operations; pipes for delivering the fluid being handled into the accumulating means at the upper portion thereof; pipes for removing the fluid being handled from the lower portion of said accumulating means; and by-pass pipes connecting the upper and lower portions of said accumulating means for delivering of clarified fluid at the upper portion thereof to the lower portion for pulp formation with the accumulated residue thereat.

2. A pumping plant as claimed in claim 1 wherein said accumulating means comprises a hollow elongated member depending from each chamber and in communication with the lower cavity thereof.

3. A pumping plant as claimed in claim 1 wherein said chambers are joined in pairs via the pump such that pairs of chambers operate alternately, and in the course of operation of each pair the working fluid is delivered into one chamber while it is sucked from the other.

4. A pumping plant as claimed in claim 1 wherein said movable means comprise a diaphragm in each chamber.

5. A pumping plant as claimed in claim 1 wherein valve means in said pipes between said chambers and said pump provides communication between the chambers to which fluid is being delivered and the chambers from which the fluid is being sucked.

References Cited

UNITED STATES PATENTS

| | | | |
|---|---|---|---|
| 1,666,255 | 4/1928 | Corey et al. | 103—49X |
| 2,018,700 | 10/1935 | Blau | 103—204 |
| 2,612,846 | 10/1952 | McCombie | 103—204X |
| 2,646,000 | 7/1953 | Schmidt | 103—45 |
| 2,673,525 | 3/1954 | Lucas | 103—152 |

ROBERT M. WALKER, Primary Examiner